United States Patent
Nam et al.

(10) Patent No.: US 10,862,560 B2
(45) Date of Patent: Dec. 8, 2020

(54) PDSCH RATE MATCHING FOR APERIODIC CSI-RS

(71) Applicant: QUALCOMM Incorporated, San Diego, CA (US)

(72) Inventors: Wooseok Nam, San Diego, CA (US); Tao Luo, San Diego, CA (US); Alexandros Manolakos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/237,991

(22) Filed: Jan. 2, 2019

(65) Prior Publication Data

US 2019/0312621 A1 Oct. 10, 2019

Related U.S. Application Data

(60) Provisional application No. 62/653,766, filed on Apr. 6, 2018.

(30) Foreign Application Priority Data

Apr. 6, 2018 (GR) .............................. 20180100153

(51) Int. Cl.
*H04W 72/04* (2009.01)
*H04B 7/06* (2006.01)
(Continued)

(52) U.S. Cl.
CPC ......... *H04B 7/0626* (2013.01); *H04B 7/0617* (2013.01); *H04L 1/0013* (2013.01);
(Continued)

(58) Field of Classification Search
CPC .. H04B 7/0626; H04B 7/0617; H04B 7/0413; H04L 1/0013; H04L 5/0048;
(Continued)

(56) References Cited

U.S. PATENT DOCUMENTS

| 2012/0329400 A1* | 12/2012 | Seo ........................ H04L 5/00 455/63.1 |
| 2015/0173049 A1* | 6/2015 | Chen ................... H04W 72/042 370/329 |

(Continued)

OTHER PUBLICATIONS

Ericsson: "Joint Activation of Aperiodic/semi-persistent CSI-IM and ZP CSI-RS", 3GPP Draft; R1-1802747 Joint Activation of Aperiodic/semi-persistent CSI-IM and ZP CSI-RS, 3rd Generation Partnership Project (3GPP), Mobile Competence Centre, 650, Route Des Lucioles, F-06921 Sophia-Antipolis Cedex, France, vol. RAN WG1, No. Athens, Greece; Feb. 26, 2018-Mar. 2, 2018 Feb. 17, 2018, XP051398179, Retrieved from the Internet: URL:http://www.3gpp.org/ftp/tsg%5Fran/WG1%5FRL1/TSGR1%05F92/Docs/ [retrieved on Feb. 17, 2018], section 2, 5 pages.
(Continued)

*Primary Examiner* — Mohamed A Kamara
(74) *Attorney, Agent, or Firm* — Arent Fox, LLP

(57) ABSTRACT

A method, apparatus, and computer-readable medium are provided that improve decoding of downlink data that has been rate matched around aperiodic tracking reference signals, e.g., aperiodic CSI-RS. A UE receives a downlink control channel scheduling a downlink data channel. The downlink control channel may comprise an indication of a zero-power channel state information-reference signal (ZP CSI-RS) configuration from a base station. The UE receives the downlink data channel that is rate matched around CSI-RS resources indicated in the ZP CSI-RS configuration and decodes the downlink data channel based on the indication of the ZP CSI-RS configuration received from the base station.

25 Claims, 14 Drawing Sheets

(51) Int. Cl.
  *H04L 1/00* (2006.01)
  *H04L 5/00* (2006.01)
  *H04W 76/27* (2018.01)
  *H04B 7/0413* (2017.01)

(52) U.S. Cl.
  CPC ......... *H04L 5/0048* (2013.01); *H04W 72/042* (2013.01); *H04W 72/0446* (2013.01); *H04W 72/0453* (2013.01); *H04W 76/27* (2018.02); *H04B 7/0413* (2013.01)

(58) Field of Classification Search
  CPC ..... H04L 1/0069; H04L 5/005; H04L 5/0057; H04L 5/0044; H04W 72/042; H04W 72/0453; H04W 76/27; H04W 72/0446
  See application file for complete search history.

(56) References Cited

U.S. PATENT DOCUMENTS

| | | | | |
|---|---|---|---|---|
| 2015/0223254 | A1* | 8/2015 | Guo | H04W 72/0493 370/312 |
| 2016/0127095 | A1* | 5/2016 | Chen | H04L 5/0048 370/329 |
| 2018/0241523 | A1* | 8/2018 | Noh | H04L 5/0048 |
| 2019/0089436 | A1* | 3/2019 | Wei | H04L 5/0082 |
| 2020/0059874 | A1* | 2/2020 | Noh | H04L 5/0007 |

OTHER PUBLICATIONS

Ericscon: "On Rate Matching using ZP CSI-RS and CSI-IM", 3GPP Draft; R1-1800694 On Rate Matching using ZP CSI-RS and CSI-IM, 3rd Generation Partnership Project (3GPP), Mobile Competence Centre, 650, Route Des Lucioles, F-06921 Sophia-Antipolis Cedex, France, vol. RAN WG1, No. Vancouver, Canada; Jan. 22, 2018-Jan. 26, 2018, Jan. 13, 2018, XP051385012, Retrieved from the Internet: URL:http://www.3gpp.org/ftp/tsg%5Fran/WG1%5FRL1/TSGR1%5FAH/NR%5FAH%5F1801/Docs/[retrieved on Jan. 13, 2018], sections 2-4, 8 pages.
International Search Report and Written Opinion—PCT/US2019/02589—ISA/EPO—dated Jan. 1, 2019.

* cited by examiner

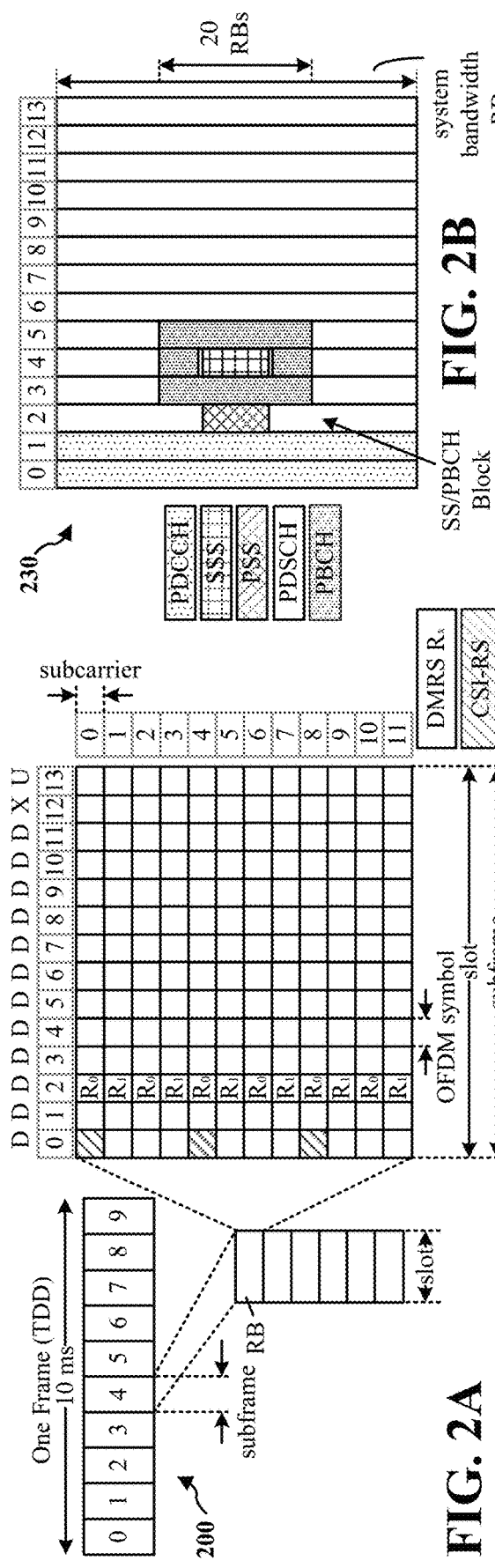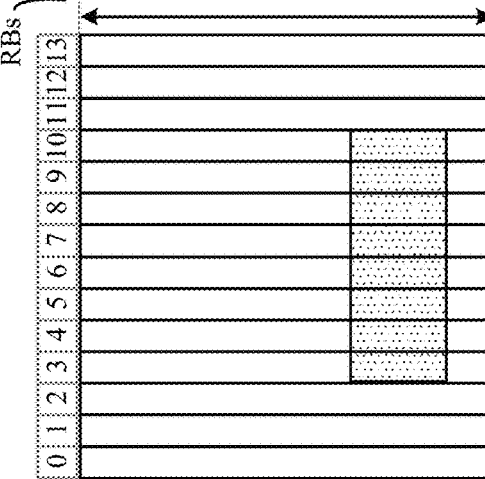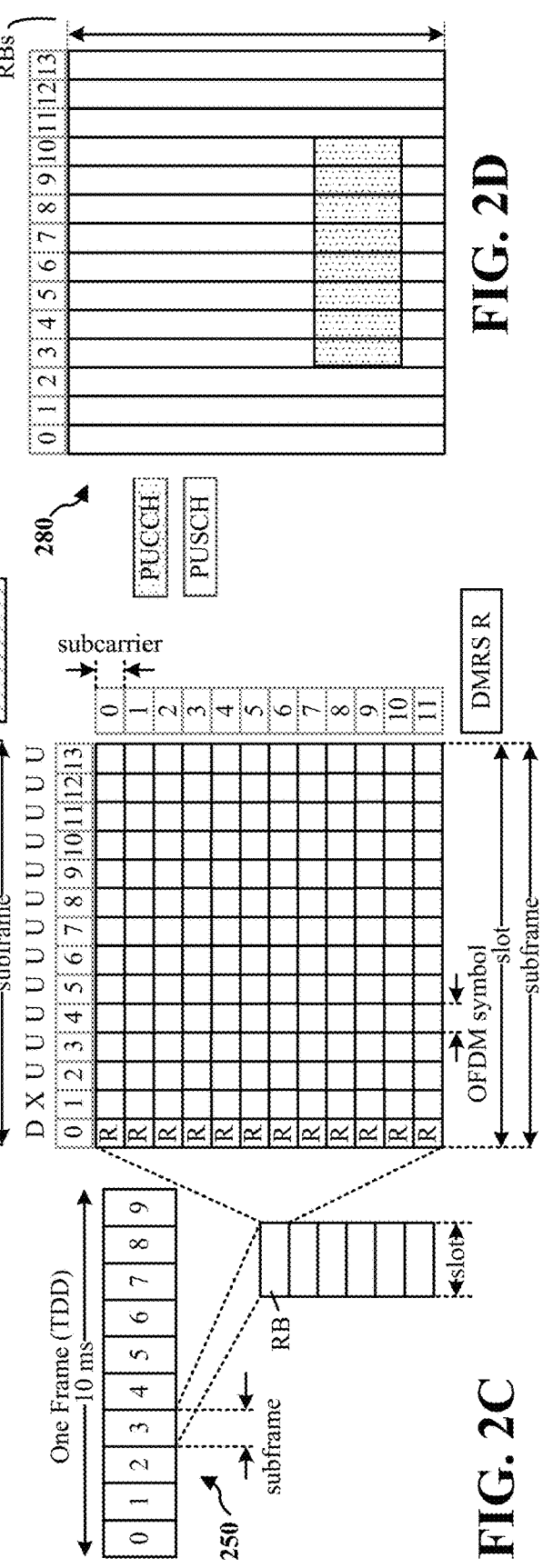
FIG. 2A  FIG. 2B  FIG. 2C  FIG. 2D

PDSCH RATE MATCHING FOR APERIODIC CSI-RS

CROSS-REFERENCE TO RELATED APPLICATION(S)

This application claims the priority of U.S. Provisional Application Ser. No. 62/653,766, entitled "PDSCH RATE MATCHING FOR APERIODIC CSI-RS" and filed on Apr. 6, 2018, and to Greek Patent Application No. 20180100153, entitled "PDSCH RATE MATCHING FOR APERIODIC CSI-RS" and filed on Apr. 6, 2018, the disclosures of both of which are expressly incorporated by reference herein in their entirety.

BACKGROUND

Technical Field

The present disclosure relates generally to communication systems, and more particularly, to communication involving rate matching.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A downlink control information (DCI) for scheduling of a physical uplink shared channel (PUSCH) (i.e., UL DCI) comprised in a physical downlink control channel (PDCCH) may trigger an aperiodic Channel State Information Reference Signal (CSI-RS), e.g. for tracking. A base station may rate match data, e.g., a physical downlink shared channel (PDSCH) around the CSI-RS resources. A User Equipment (UE) should assume the same rate matching (RM) to decode the PDSCH correctly. At times, a UE may have problems successfully decoding the data. For example, when the UE is not successful in decoding the UL DCI triggering the aperiodic CSI-RS, the UE may not be aware of the CSI-RS and may improperly decode the data by not decoding based on rate matching around such CSI-RS resources. The present application provides a solution to this problem by providing an indication to the UE of a zero-power Channel State Information Reference Signal (ZP CSI-RS) configuration in downlink control signaling, e.g., in a DCI for scheduling of a PDSCH (i.e., DL DCI). The UE may receive the downlink data channel that is rate matched around CSI-RS resources indicated in the ZP CSI-RS configuration. The UE may use information from the ZP CSI-RS configuration to decode the downlink data channel.

In an aspect of the disclosure, a method, a computer-readable medium, and an apparatus are provided for wireless communication at a UE. The apparatus receives receiving a downlink control channel scheduling a downlink data channel, wherein the downlink control channel comprises an indication of a zero-power channel state information-reference signal (ZP CSI-RS) configuration from a base station, wherein the ZP CSI-RS configuration corresponds to resources associated with an aperiodic tracking reference signal. The apparatus receives the downlink data channel, wherein the downlink data channel is rate matched around CSI-RS resources indicated in the ZP CSI-RS configuration and decodes the downlink data channel based on the indication of the ZP CSI-RS configuration received from the base station.

In another aspect of the disclosure, a method, a computer-readable medium, and an apparatus are provided for wireless communication at a base station. The apparatus transmits a downlink control channel scheduling a downlink data channel, wherein the downlink control channel comprises an indication of a zero-power channel state information-reference signal (ZP CSI-RS) configuration to a user equipment, wherein the ZP CSI-RS is configured for rate matching of an aperiodic tracking reference signal. The apparatus rate matches the downlink data channel around CSI-RS resources indicated in the ZP CSI-RS configuration and transmits the downlink data channel.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a DL subframe, DL channels within the DL subframe, an UL subframe, and UL channels within the UL subframe, respectively, for a 5G/NR frame structure.

DETAILED DESCRIPTION

Figure 1:
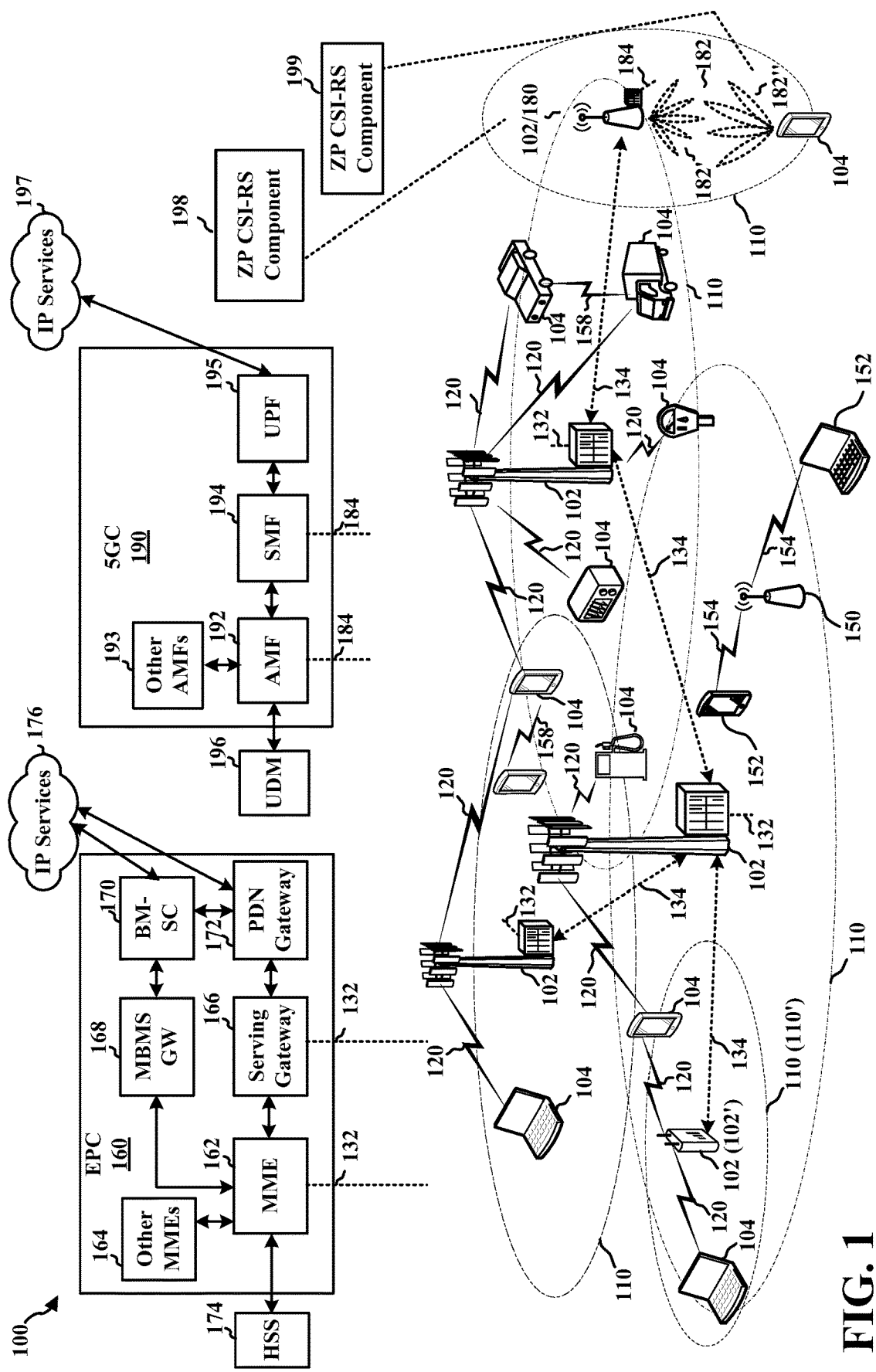
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190. The base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base station 180 may perform PDSCH rate matching for aperiodic CSI-RS for tracking in FR2. The base station 180 may comprise a ZP CSI-RS component 198 that is configured to transmit an indication of a ZP CSI-RS configuration to the UE 140. The indication may be comprised in a downlink control channel scheduling a downlink data channel, e.g., in DL DCI. The base station 180 may transmit the downlink data channel to the UE 104. The base station 180 may be further configured to transmit CSI-RS resources. The downlink data channel may be rate matched around the CSI-RS resources indicated in the ZP CSI-RS configuration. In some aspects, the UE 104 may comprise a ZP CSI-RS component 199 that is configured to receive the indication of ZP CSI-RS configuration from the base station 180. The UE 104 may be further configured to receive the downlink data channel, where the downlink data channel is rate matched around CSI-RS resources indicated in the ZP CSI-RS configuration. The UE 104 may be further configured to decode the downlink data channel based on the indication of the ZP CSI-RS configuration received from the base station.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kKz, where $\mu$ is the numerology 0 to 5. As such, the numerology $\mu$t=0 has a subcarrier spacing of 15 kHz and the numerology $\mu$=5 has a subcarrier spacing of 480 kHz. The symbol length/duration is inversely related to the subcarrier spacing. FIGS. 2A-2D provide an example of slot configuration 0 with 14 symbols per slot and numerology $\mu$=0 with 1 slot per subframe. The subcarrier spacing is 15 kHz and symbol duration is approximately 66.7 ρs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
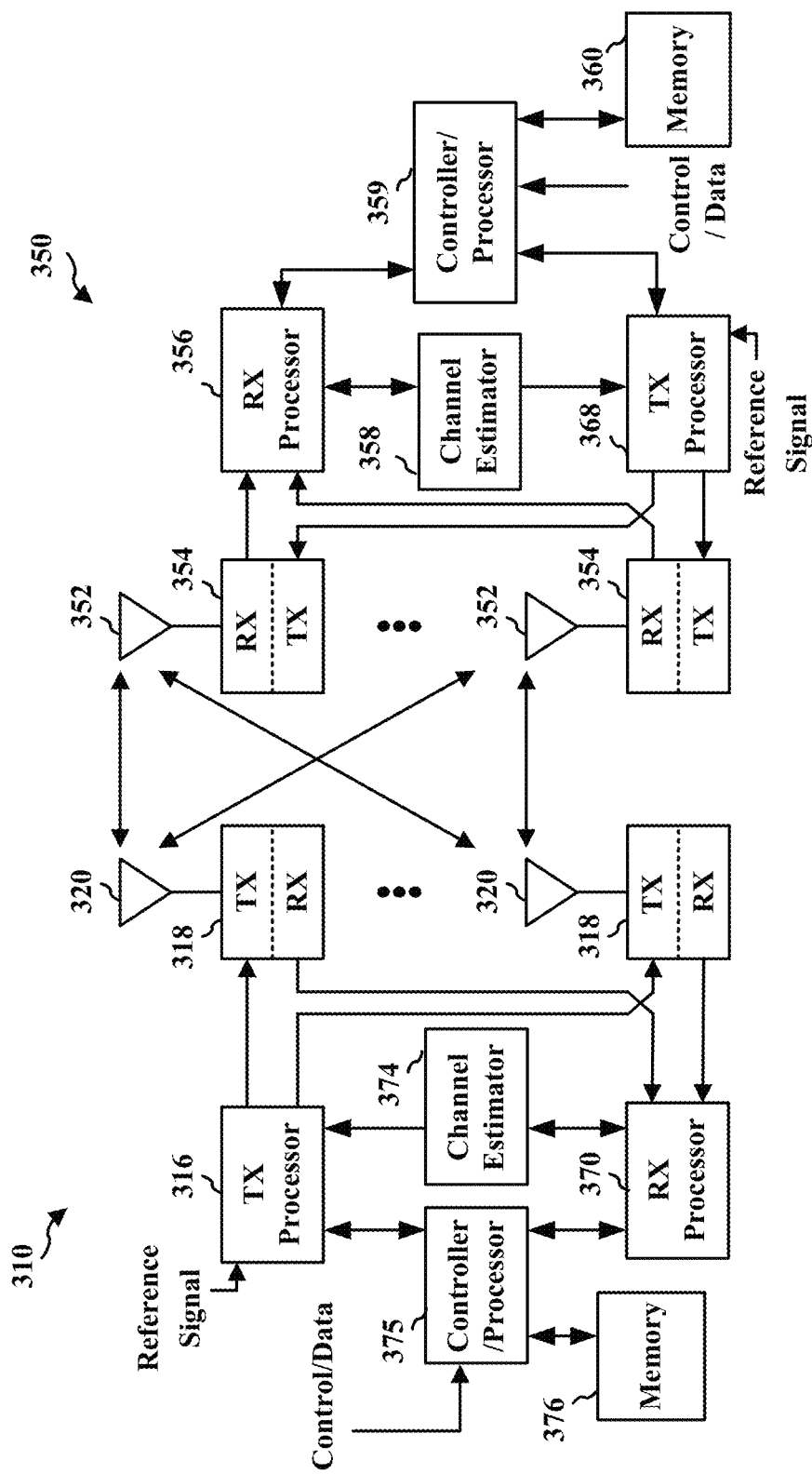
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
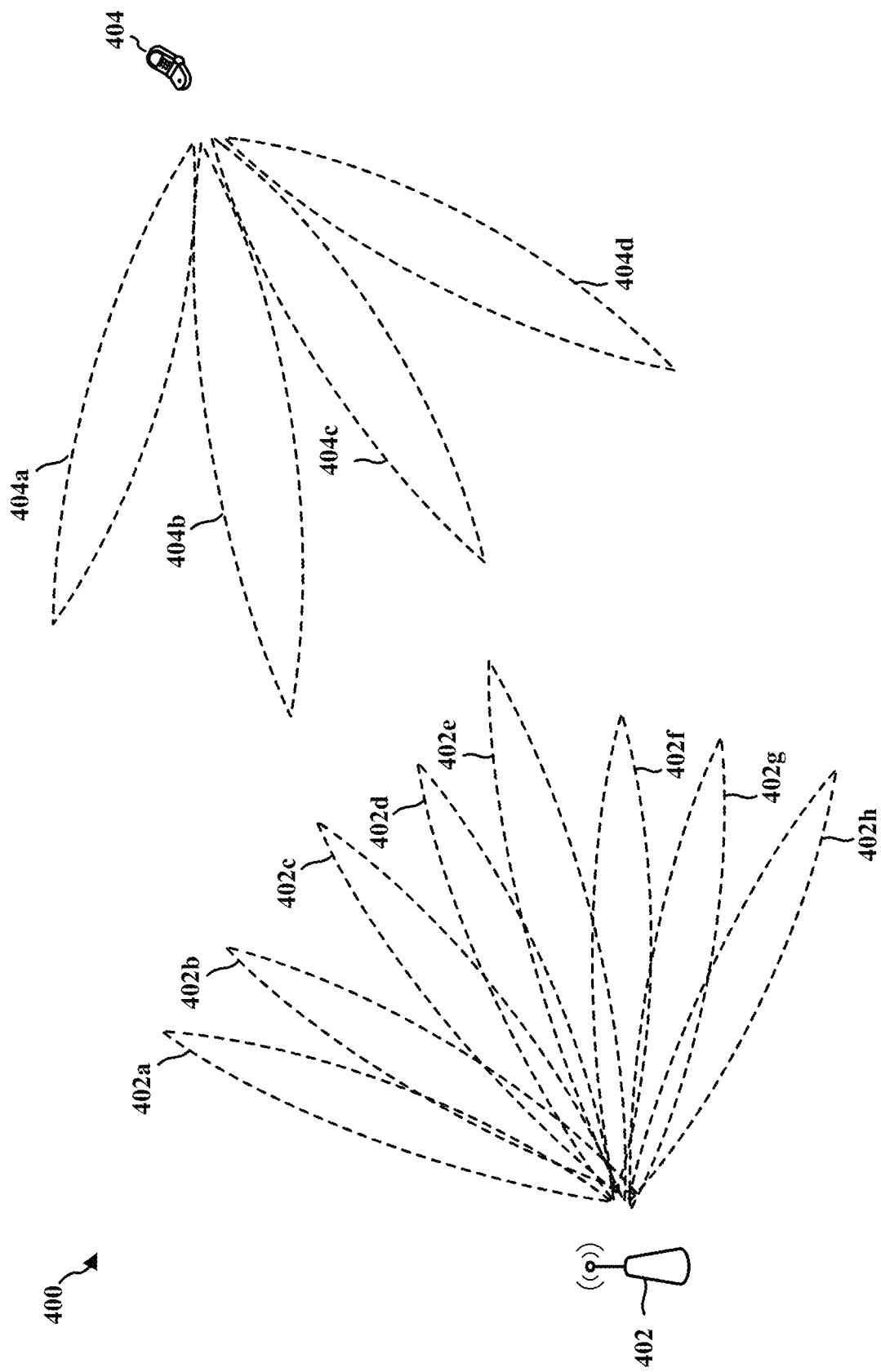
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

Figure 5A:
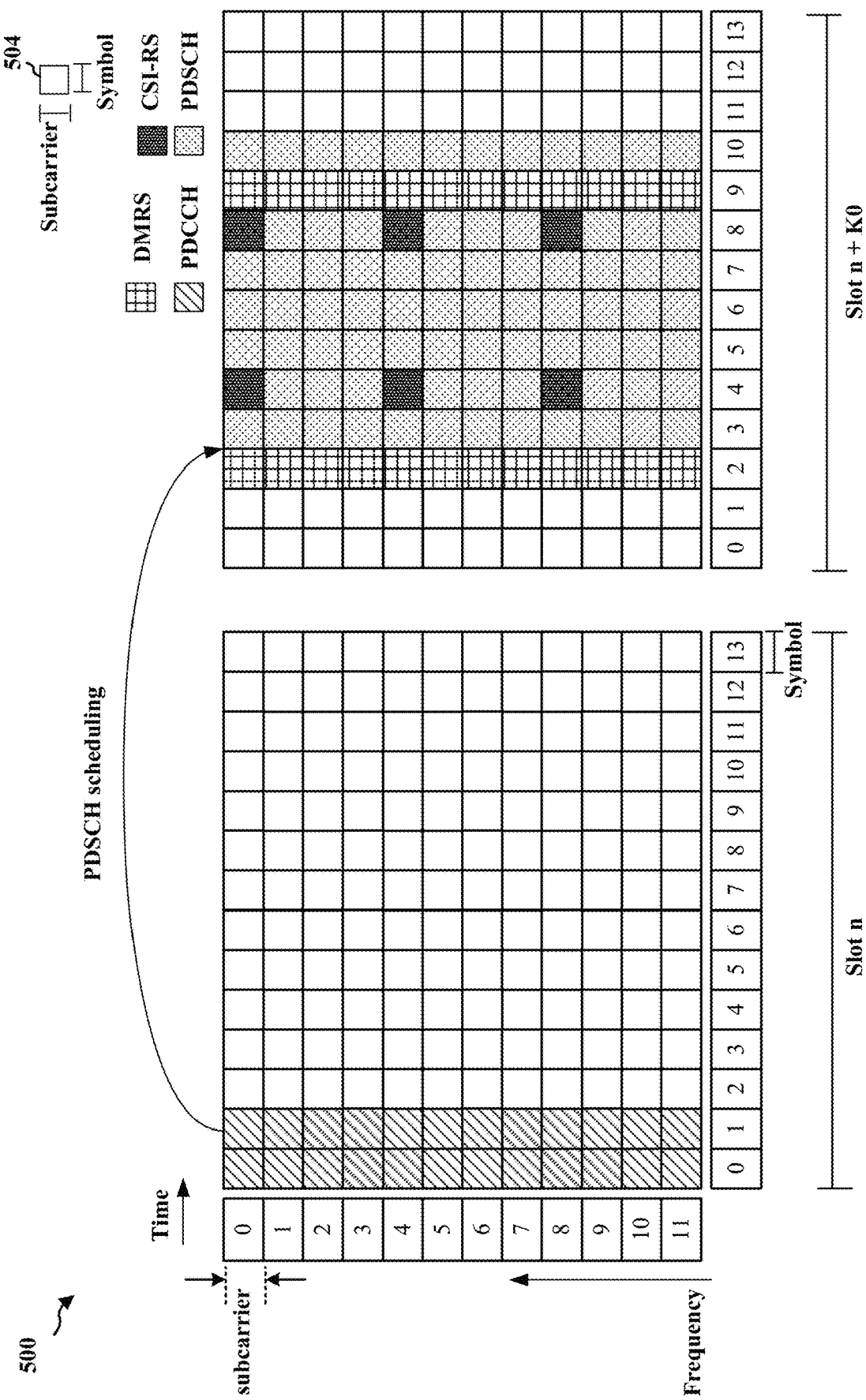
FIG. 5A and FIG. 5B are diagrams illustrating examples of RM for periodic/semi-persistent CSI-RS in Frequency Range 2 (FR2).
Figure 5B:
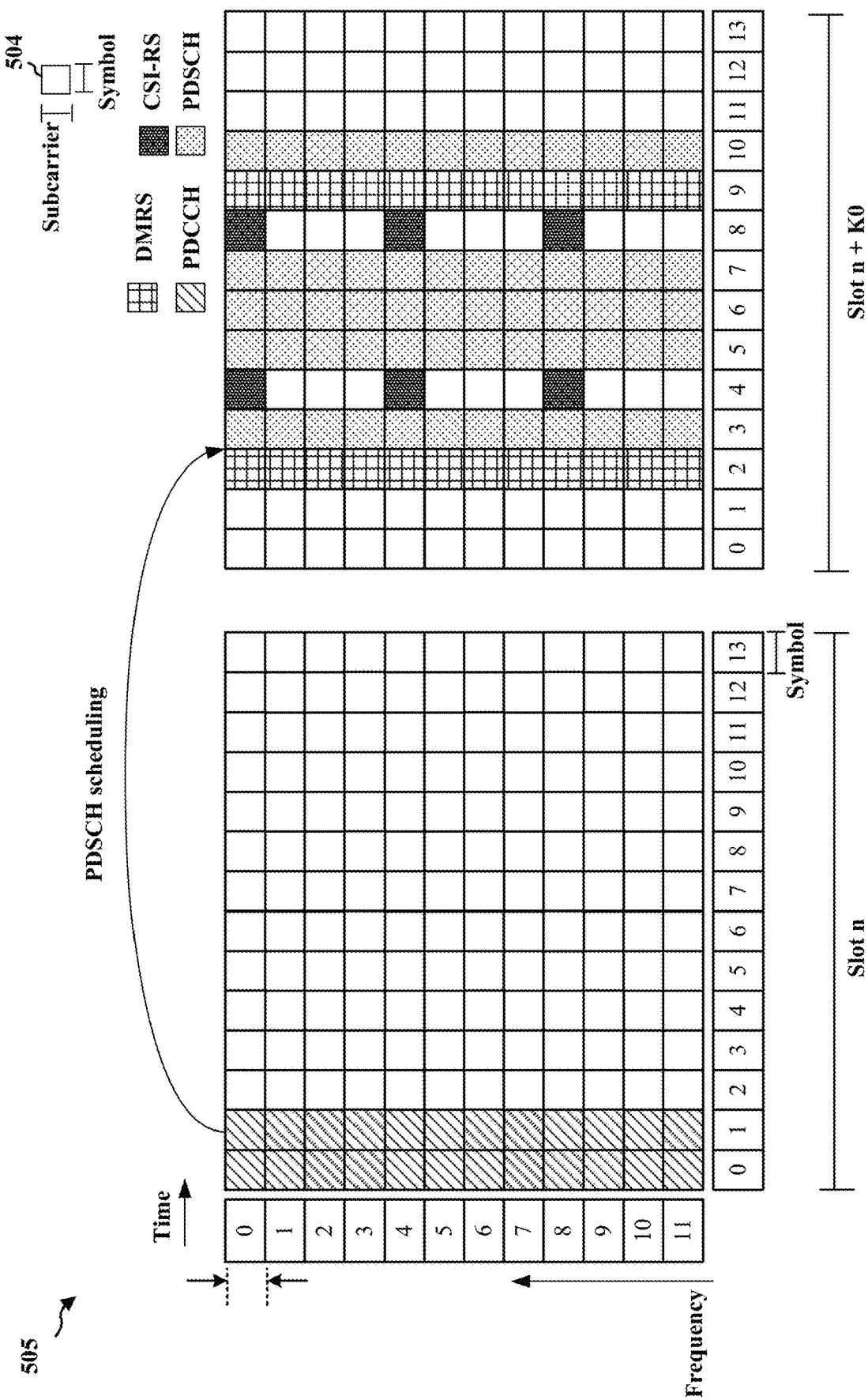

FIG. 5A and FIG. 5B are diagrams illustrating examples of rate matching for periodic/semi-persistent (P/SP) CSI-RS in FR2, e.g., in mmW communication. There may be different PDSCH rate matching rules. For example, there may be different PDSCH rate matching rules in 5G NR than in other types of wireless communication. For example, PDSCH may be rate matched around a Demodulation Reference Signal (DMRS), CSI-RS, scheduling PDCCH, etc. Wireless communication may support resource reservation for PDSCH rate matching including resource block (RB)-symbol level granularity and resource element (RE) level granularity. For example, RB-symbol level granularity may be used for future/backward compatible resources, Control Resource Sets (CORESETs), Synchronization Signal Blocks (SSBs), etc. RE level granularity rate matching may be based on zero-power CSI-RS resource configurations, which may be indicated with DL scheduling DCI. RE level granularity rate matching may be used, e.g., for CSI-RS resources of other co-scheduled UEs.

For rate matching in FR2, spatial-Quasi Co-Location (QCL) may be configured to indicate a UE's reception beams to be used for reference signals as well as physical channels. Example aspects of reception beams are described in connection with FIG. 4. Due to the beam constraint from the UE perspective, multiplexing of Reference signals and/or physical channels with different spatial-QCL assumptions in the same OFDM symbol may be restricted. Thus, this may restrict the multiplexing of both CSI-RS and PDSCH within a single symbol. Therefore, RE level rate matching of PDSCH may not always be possible in FR2. In such cases, OFDM symbol level rate matching may be more appropriate.

For rate matching for periodic/semi-persistent CSI-RS in FR2, if QCL-TypeD is the same between the scheduled PDSCH and CSI-RS resources, resource element level rate matching, e.g., frequency division multiplexed (FDM), of PDSCH can be used, as shown in FIG. 5A. FIG. 5A illustrates a rate matching example 500 in which PDCCH 502 in slot n used to schedule PDSCH in a later slot, e.g., slot n+k0, where k0 is usually a standard delay. As illustrated in FIG. 5A, a single resource element 504 may correspond to one symbol in time and one subcarrier in frequency. FIG. 5A illustrates PDSCH rate matched on a resource element level, such that PDSCH is FDM within the same symbol as CSI-RS resources, e.g., at the resource elements within the symbol that are not configured for CSI-RS.

In the situations when QCL-TypeD (spatial-QCL) is different between the scheduled PDSCH and CSI-RS resource, rate matching of PDSCH may be limited to symbol-level rate matching, as shown in FIG. 5B. FIG. 5B illustrates an example 505 of rate matching, e.g., in which the PDSCH is not FDM within a symbol that comprises CSI-RS. Thus, the PDSCH is only included in symbols that do not include CSI-RS. For example, in FIG. 5B, PDSCH is not transmitted in symbols 4 and 8 that include CSI-RS. As persistent/semi-persistent CSI-RS resources are configured for the UE with RRC signaling, the UE can decode the PDSCH without an additional indication for rate matching resources in connection with PDSCH scheduling.

However, problems can occur in decoding PDSCH in connection with aperiodic CSI-RS. Unlike persistent or semi-persistent CSI-RS, aperiodic CSI-RS might not be configured for the UE with RRC signaling, and may instead be triggered in an aperiodic manner. For example, aperiodic CSI-RS may be triggered by UL DCI, e.g., DCI scheduling UL communication. One example, of aperiodic CSI-RS may comprise CSI-RS for tracking, e.g., which may also be referred to as an aperiodic tracking reference signal, e.g., A-TRS. A base station may rate match PDSCH around aperiodic CSI-RS, such as for tracking. However, this can cause problems with decoding PDSCH at the UE when the UE is not aware of the presence of multiplexed aperiodic CSI-RS in PDSCH. For example, when a UE does not successfully decode an UL DCI that triggers an aperiodic CSI-RS, the UE will not be aware of the CSI-RS and will not be aware that the base station may rate match scheduled PDSCH around such aperiodic CSI-RS resources.

Figure 6:
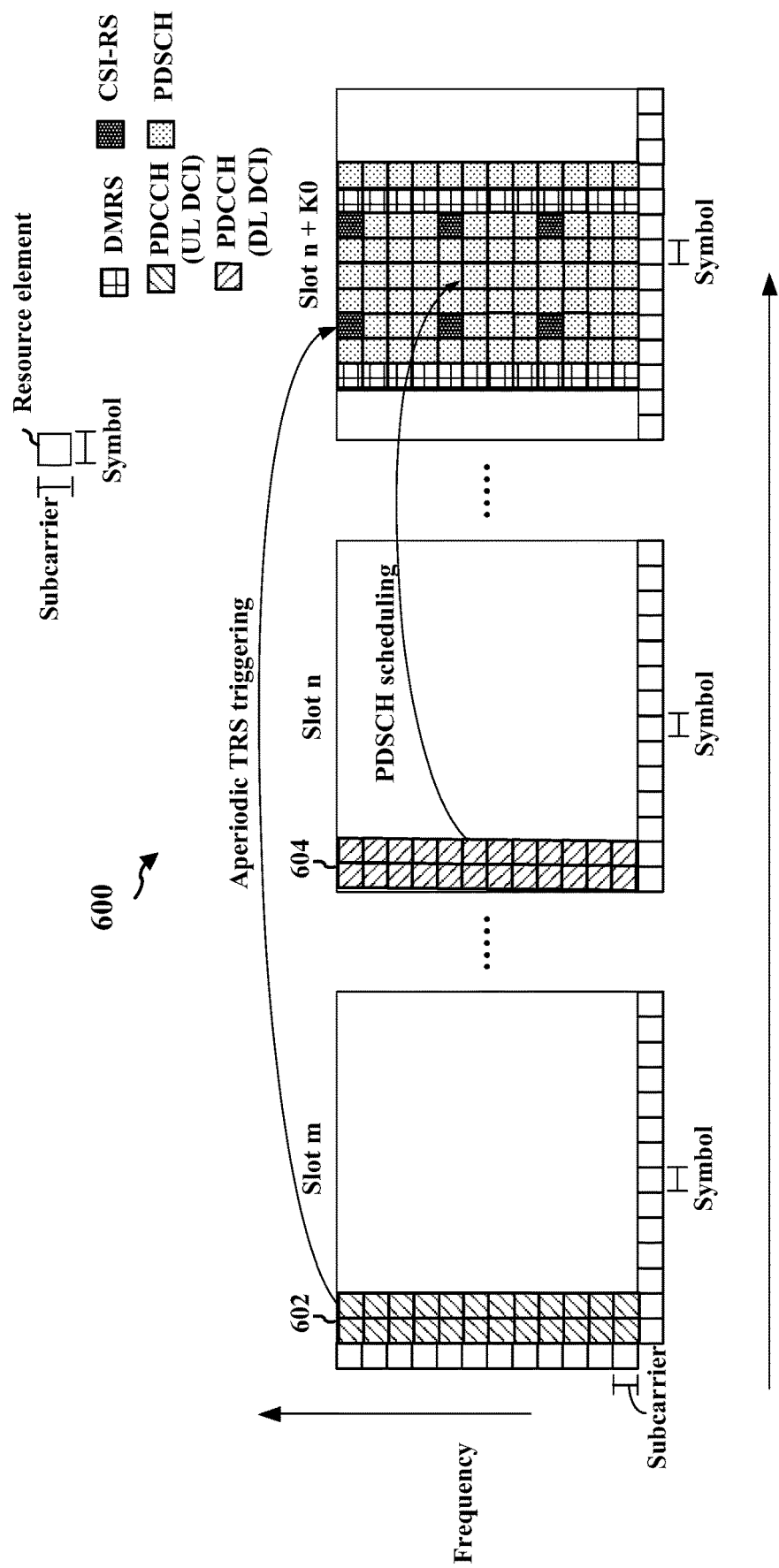
FIG. 6 is a diagram illustrating an example of triggering of aperiodic CSI-RS for tracking.

FIG. 6 is a diagram illustrating an example solution 600 to PDSCH decoding problems associated with aperiodic CSI-RS (A-CSI-RS). In FIG. 6, an aperiodic CSI-RS, e.g., for tracking, may be triggered by UL DCI in PDCCH transmitted by the base station in slot m. The A-CSI-RS may be transmitted by the base station in a later slot, slot n+k0, similar to the examples in FIGS. 5A and 5B. PDSCH scheduled for the UE in slot n+k0 may be rate matched around the A-CSI-RS triggered by UL DCI in PDCCH 602. While resource element level rate matching is illustrated in FIG. 6, the PDSCH may be rate matched around the A-CSI-RS in a symbol level manner in another example, as illustrated in FIG. 5B.

However, there are situations when the UE misses the UL DCI. If the UE does not successfully decode the UL DCI in slot m that triggers the A-CSI-RS in slot n+k0, the UE does not know the presence of multiplexed A-CSI-RS and will not assume any PDSCH RM. This may cause failure of PDSCH decoding leading to errors in communication between the base station and the UE.

While a priority rule may be defined to prevent the error, such priority rules may lead to performance degradation in certain situations. One example priority rule may indicate that when PDSCH and A-CSI-RS collide in the same OFDM symbol, the UE assumes that A-CSI-RS is dropped and only PDSCH is transmitted by the base station, and the UE only processes PDSCH decoding. This priority rule will lead the UE to only process PDSCH. In certain situations, such as A-CSI-RS for tracking, dropping the CSI-RS transmission may result in significant performance degradation. For example, a single tracking reference signal (TRS) burst may be composed of up to 4 TRS symbols. Dropping any of the four TRS symbols within the burst may make the entire TRS burst useless and impair the UE's time/frequency tracking performance. Therefore, the UE may need to consider matching for A-CSI-RS for tracking when decoding PDSCH.

In FIG. 6, a solution is provided in which a separate indication may be provided to the UE regarding the A-CSI-RS. PDCCH 604 scheduling the PDSCH, e.g., DL DCI scheduling the PDSCH, may include an indication regarding the aperiodic CSI-RS. The DL DCI is transmitted to the UE in a slot prior to slot n+k0 comprising the PDSCH/A-CSI-RS. For example, along with the DL DCI scheduling the PDSCH may be sent in slot n that is transmitted after slot m in which the UL DCI triggered the A-CSI-RS and prior to slot n+k0 in which the PDSCH/A-CSI-RS are transmitted. For example, a ZP CSI-RS resource(s) may be indicated to the UE along with the DL DCI 604 scheduling the PDSCH, e.g., in a ZP CSI-RS trigger field. The ZP CSI-RS trigger field may comprise, e.g., a DCI format 1_1 ZP CSI-RS trigger field.

Figure 7:
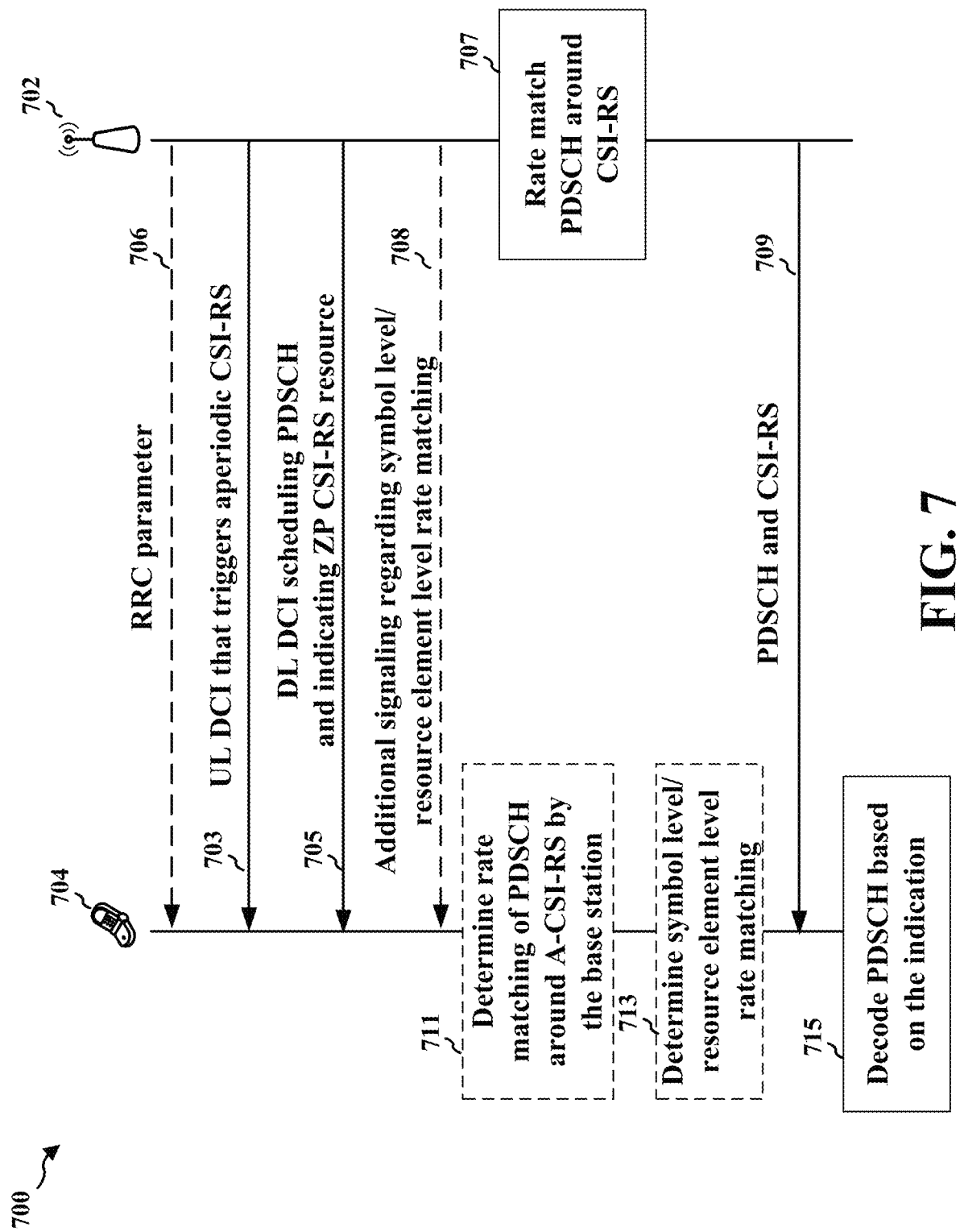
FIG. 7 is a flow diagram illustrating an example of RM for aperiodic CSI-RS for tracking in FR2.

FIG. 7 is a flow diagram 700 illustrating an example of wireless communication involving rate matching PDSCH around A-CSI-RS, e.g., for tracking, between a base station 702 (e.g., 102, 180, 310, 402, etc.) and a UE 704 (e.g., 104, 350, 404, etc.). The wireless communication may comprise mmW/FR2 communication. In some aspects, the base station 702 may perform PDSCH rate matching for A-CSI-RS for tracking in FR2. The method provides a solution to problems that may occur with decoding PDSCH at the UE when the UE is not aware of the presence of multiplexed aperiodic CSI-RS in PDSCH. The base station may transmit UL DCI 703 that triggers A-CSI-RS (e.g., UL DCI 602).

The base station 702 may also be configured to transmit an indication 705 of a ZP CSI-RS configuration to the UE 704. The UE 704 may be configured to receive the indication of ZP CSI-RS 705 configuration from the base station 702. The indication may be comprised in a downlink control channel, e.g., DL DCI, scheduling a downlink data channel, e.g., PDSCH, that will be rate matched around the A-CSI-RS. The base station 702 may rate match the scheduled PDSCH around the A-CSI-RS resources at 707, as indicated in the ZP CSI-RS configuration and may transmit the PDSCH/CSI-RS 709 to the UE 704. The UE 704 may receive the PDSCH and may use the indication received at 705 to assist in decoding the PDSCH at 715.

In some aspects, the ZP CSI-RS configuration indicated at 705 may correspond to resources associated with an aperiodic tracking reference signal, which may be referred to as an A-TRS.

If the UE 704 has successfully decoded the UL DCI 703 triggering A-TRS, the ZP CSI-RS resource indication may contain redundant information. In this example, the ZP CSI-RS configuration in 705 may be discarded by the UE, because the UE is already aware of the A-CSI-RS triggered by the UL DCI, and will be able to decode PDSCH rate matched around the A-CSI-RS. By providing the ZP CSI-RS configuration indication 705 in DL DCI scheduling the PDSCH, even if the UE 704 fails to decode the UL DCI 703, PDSCH decoding by the UE is not impacted. For example, based on receiving the indication 705, the UE may determine at 711, that the UE will rate match PDSCH around CSI-RS resources indicated in the ZP CSI-RS, even if the absence of a successful decoding of UL DCI triggering an A-CSI-RS.

In some other aspects, a UE may assume that the PDSCH is rate matched by the base station based on symbol level rate matching. While ZP CSI-RS may apply to resource element level rate matching in other circumstances, when it is used in FR2 for an aperiodic tracking reference signal rate matching indication, as described in connection with FIGS. 6 and 7, a UE may interpret the ZP CSI-RS configuration as indicating symbol level rate matching.

In another example, a parameter may be indicated to the UE to help the UE in determining whether the rate matching is symbol level or resource element level rate matching, e.g., at 713. For example, a new Radio Resource Control (RRC) parameter may be used to indicate symbol level rate matching of the PDSCH around the A-CSI-RS to the UE. The new parameter may be similar to "trs-Info" and may be used to indicate whether symbol level rate matching is ON/OFF. The new RRC parameter can be added in ZP CSI-RS configuration to indicate that the CSI-RS resource is used by the base station for symbol level rate matching. Thus, base station 702 may transmit a parameter 706 indicating that the rate matching is symbol level rate matching, and the UE 704 may receive the parameter.

In another example, the UE may use other information to determine whether to base decoding, at 715, on symbol level rate matching or resource element rate matching. For example, when the resource mapping of the ZP CSI-RS resources matches one of the UE's configured A-TRS resources, the UE 704 may assume at 713 that symbol level RM is used by the base station to rate match the PDSCH around the CSI-RS resources. The base station 702 may transmit at least one configuration of an A-TRS resource, and the UE 704 may receive the at least one configuration of the A-TRS resource. The UE 704 may determine whether a first resource mapping of the ZP CSI-RS configuration matches a second resource mapping of the at least one configuration of the A-TRS resource. When the first resource mapping matches the second resource mapping, the UE 704 may decode the PDSCH at 715 based on a symbol level rate matching around the CSI-RS resources.

In yet another example, along with the ZP CSI-RS resource indication at 705, additional signaling may be used to indicate RE/symbol level rate matching is used by the base station for the CSI-RS resource. The base station 702 may providing a second indication 708 indicating whether the rate matching is symbol level rate matching or resource element level rate matching, and the UE 704 may receive the second indication. The UE 704 may use the determination of the type of the rate matching performed by the base station in combination with the ZP CSI-RS configuration received at 705 in decoding the PDSCH at 715.

For example, when the second indication is not configured, a default interpretation by the UE may determine at 713 that the type of the rate matching performed by the base station is resource element level rate matching. In one example, the second indication may comprises at least one bit field configured in DCI. A first value, e.g., "0" may indicate resource element level rate matching and a second value, e.g., "1" may indicate symbol level rate matching. Alternately, "1" may indicate symbol level rate matching, and "0" may indicate resource element rate matching. The second indication may be an additional single bit field, which may be configured in DCI. If the additional single bit field is not configured, the default interpretation may be RE level RM.

As another example, when a Quasi Co-Location TypeD (QCL-TypeD) parameter of the data channel is the same as a QCL-TypeD parameter of an A-TRS resource(s) configured for the UE, the UE may determine at 713 that resource element level rate matching is indicated. When a QCL-TypeD parameter of the data channel is different than a QCL-TypeD parameter of the A-TRS resource configured for the UE, the UE may determine at 713 symbol level rate matching is indicated. For yet another example, when the ZP CSI-RS is used for rate matching for CSI-RS resources for a second, co-scheduled UE, the UE may determine at 713 that resource element level rate matching is be indicated. Thus, when QCL-TypeD is the same between the scheduled PDSCH and A-TRS resource, or ZP CSI-RS is used for RM for other co-scheduled UE's CSI-RS resources, RE level RM (FDM) of PDSCH can be indicated. When the QCL-TypeD is different between the scheduled PDSCH and A-TRS resource, symbol level RM of PDSCH can be indicated.

Figure 8:
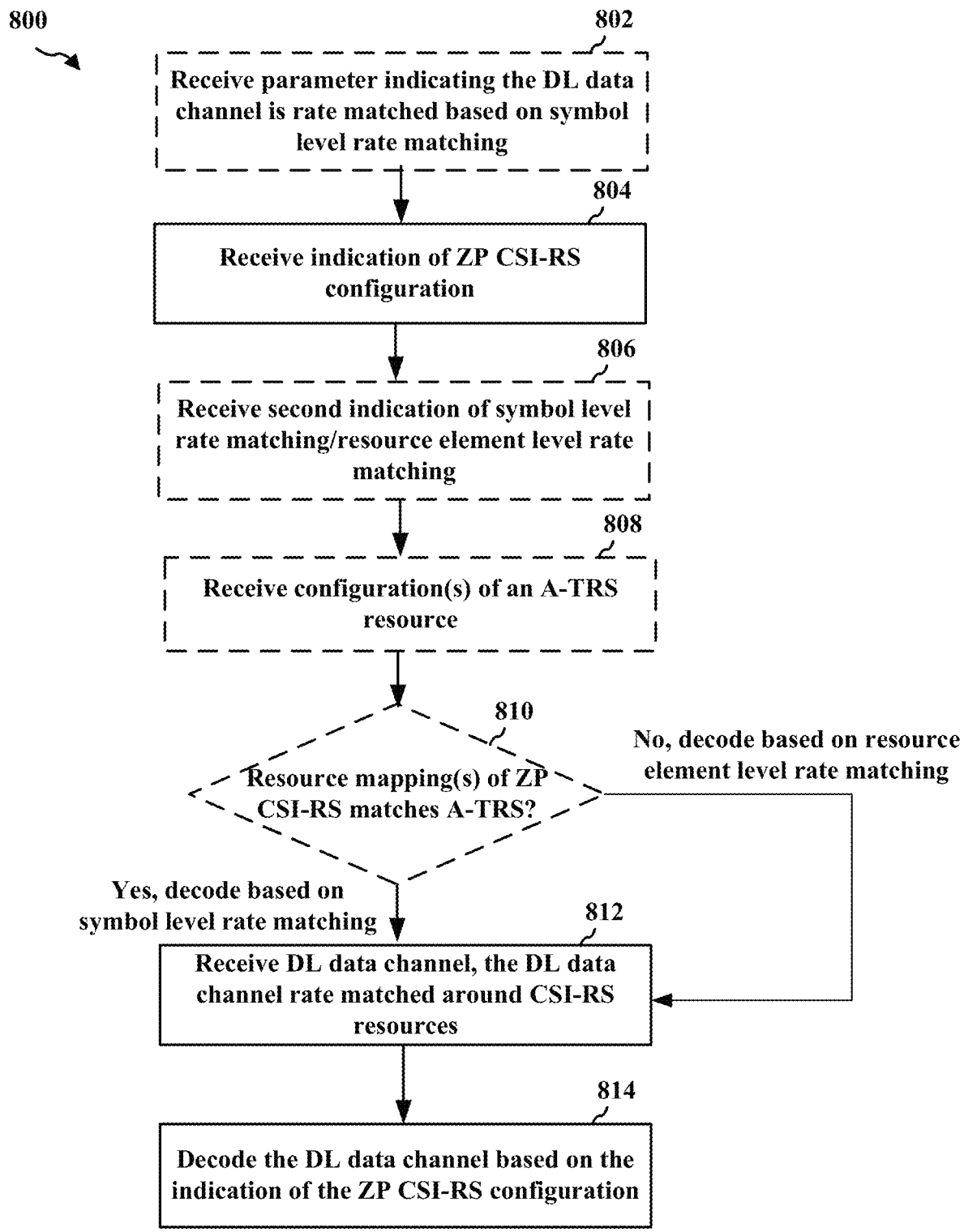
FIG. 8 is a flowchart of a method of wireless communication.

FIG. 8 is a flowchart 800 of a method of wireless communication. The method may be performed by a UE (e.g., UE 104, 350, 404, 704, 1250, the apparatus 902, 902') communicating with a base station (e.g., base station 102, 180, 402, 702, 950, the apparatus 1202, 1202'). The wireless communication may comprise 5G NR communication, e.g., FR2 or mmW communication, as described herein. Optional aspects are illustrated with a dashed line. The method provides a solution to problems that may occur with decoding PDSCH at the UE when the UE is not aware of the presence of multiplexed aperiodic CSI-RS in PDSCH.

At 804, the UE receives an indication of a ZP CSI-RS configuration from a base station, the indication comprised in a downlink control channel scheduling a downlink data channel. The downlink control channel may comprise PDCCH. The indication may be comprised in DL DCI scheduling PDSCH, example, e.g., as described in connection with 705 in FIG. 7. The downlink data channel may comprise PDSCH. The ZP CSI-RS configuration may indicate CSI-RS resources, e.g., for an aperiodic CSI-RS, such as an aperiodic CSI-RS for tracking in FR2. The ZP CSI-RS may be configured for rate matching of the aperiodic CSI-RS. In addition to the ZP CSI-RS sent, e.g., in DL DCI, a base station may indicate the presence of CSI-RS in UL DCI, e.g., transmitted prior to the DL DCI. The UL DCI may correspond to 703 described in connection with FIG. 7. For example, UL DCI may trigger aperiodic CSI-RS. If the UE has successfully decoded the UL DCI triggering the aperiodic CSI-RS, the ZP CSI-RS resource indication in the DL DCI may comprise redundant information to the information already received by the UE in the UL DCI. In such an example, the UE may even determine to discard the ZP CSI-RS configuration received in the DL DCI. However, when the UE has failed to successfully decode the UL DCI triggering the aperiodic CSI-RS, the ZP CSI-RS received in the downlink control channel at 804 may assist the UE in accurately decoding the downlink data channel.

At 812, the UE receives the downlink data channel, the downlink data channel being rate matched, by the base station, around CSI-RS resources indicated in the ZP CSI-RS configuration, e.g., as described in connection with 709 in FIG. 7. The rate matching may be symbol level rate matching, as described in connection with FIG. 5B. The rate matching may be resource element level rate matching, as described in connection with FIG. 5A.

At 814, the UE decodes the downlink data channel based on the indication of the ZP CSI-RS configuration received from the base station, e.g., as described in connection with 715 in FIG. 7. Thus, even when the UE is not successful in decoding UL DCI triggering aperiodic CSI-RS, e.g., at 703, the UE may be aware of the rate matching of the data channel around the aperiodic CSI-RS by the base station based on the ZP CSI-RS configuration received, e.g., in DL DCI 705. The use of the indication of the ZP CSI-RS configuration enables the UE to more accurately decode the data channel, e.g., PDSCH 709.

The ZP CSI-RS configuration may correspond to resources associated with an aperiodic tracking reference signal. The UE may decode the downlink data channel, at 814, based on symbol level rate matching by the base station of the downlink data channel around the CSI-RS resources. For example, when a ZP CSI-RS is used to indicate an aperiodic tracking reference signal, the UE may interpret this to always indicate a symbol level rate matching by the base station.

In one example, the UE may receive a parameter indicating the downlink data channel is rate matched, by the base station, based on symbol level rate matching, e.g., as illustrated at 802 in FIGS. 8 and 708 in FIG. 7. The parameter may comprise, e.g., a new RRC parameter. The parameter may be included in the ZP CSI-RS configuration indicated to the UE at 804. For example, a parameter similar to TRS-info may be used to indicate whether symbol level rate matching is on or off.

In another example, the UE may use a resource mapping of the ZP CSI-RS resource and a UE's configured A-TRS resource to determine whether to apply symbol level rate matching. In this example, the UE may receive, at 808, at least one configuration of an aperiodic tracking reference signal (A-TRS) resource. At 810, the UE may determine whether a first resource mapping of the ZP CSI-RS configuration matches a second resource mapping of the at least one configuration of the aperiodic tracking reference signal resource. When the first resource mapping matches the second resource mapping, the UE may decode the downlink data channel at 814 based on symbol level rate matching. When the UE does not determine that the first resource mapping matches the second resource mapping, the UE may decode the downlink data channel at 814 based on resource element level rate matching.

In yet another example, the UE may receive a second indication indicating whether the rate matching is symbol level rate matching or resource element level rate matching, at 806. Then, the UE may select the type of the rate matching on which the decoding, at 814, is based, based on the second indication. For example, if the second indication indicates that the base station employed symbol level rate matching of the data channel around the CSI-RS, the UE may decode the downlink data channel based on an understanding of the symbol level rate matching employed by the base station. In contrast, if the second indication indicates that the base station employed resource element level rate matching of the data channel around the CSI-RS, the UE may decode the downlink data channel based on an understanding of the resource element level rate matching employed by the base station. Thus, the decoding is based not only on an indication of the ZP CSI-RS, but also on a second indication that indicates the type of rate matching (e.g., symbol level/resource element level) employed by the base station. The second indication may comprise, e.g., at least one bit field configured in DCI, wherein a first value indicates resource element level rate matching and a second value indicates symbol level rate matching. The second indication may comprise a single bit, e.g., where "0" indicates resource element level rate matching and "1" indicates symbol level rate matching or vice versa. When the second indication is not configured, a default interpretation by the UE may be used to determine/assume that the type of the rate matching performed by the base station is resource element level rate matching.

The CSI-RS resources may comprise a resource for an aperiodic tracking reference signal. The UE may determine that resource element level rate matching is indicated by the second indication, e.g., when a Quasi Co-Location TypeD (QCL-TypeD) parameter of the data channel is the same as a QCL-TypeD parameter of the resource for the aperiodic tracking reference signal. In another example, the UE may determine that symbol level rate matching is indicated when a QCL-TypeD parameter of the data channel is different than a QCL-TypeD parameter of the resource for the aperiodic tracking reference signal.

The ZP CSI-RS may be used to indicate CSI-RS resources scheduled for the UE and/or scheduled for other UEs. The UE may determine that resource element level rate matching by the base station is indicated when the ZP CSI-RS is for rate matching for CSI-RS resources for a second, co-scheduled UE rather than for the UE itself.

Figure 9:
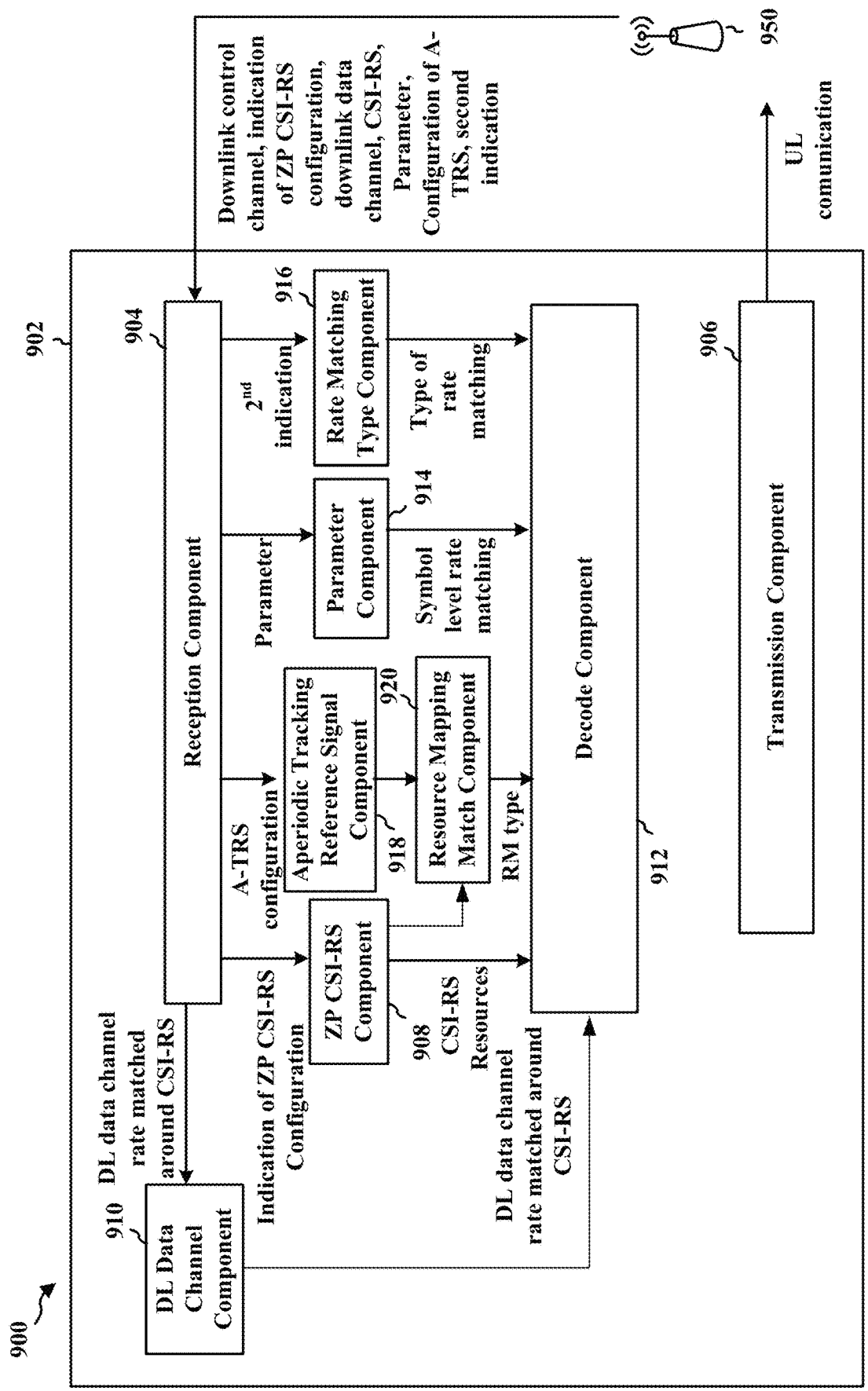
FIG. 9 is a conceptual data flow diagram illustrating the data flow between different means/components in an example apparatus.

FIG. 9 is a conceptual data flow diagram 900 illustrating the data flow between different means/components in an example apparatus 902. The apparatus may be a UE (e.g., UE 104, 350, 404, 704, 1250) communicating with a base station 950 (e.g., base station 102, 180, 402, 702, the apparatus 1202, 1202'). The wireless communication may comprise 5G NR communication, e.g., FR2 or mmW communication, as described herein. The apparatus includes a reception component 904 that receives downlink communication from base station 950 and a transmission component 906 that transmits uplink communication to the base station. The apparatus includes a ZP CSI-RS component 908 configured to receive, e.g., via reception component 904, an indication of a ZP CSI-RS configuration from a base station, the indication comprised in a downlink control channel scheduling a downlink data channel, e.g., DL DCI, e.g., as described in connection with 804 in FIG. 8. The apparatus may include a downlink data channel component 910 configured to receive, e.g., via reception component 904, the downlink data channel, wherein the downlink data channel is rate matched around CSI-RS resources indicated in the ZP CSI-RS configuration, e.g., as described in connection with 812 in FIG. 8. The apparatus may include a decode component 912 configured to decode the downlink data channel based on the indication of the ZP CSI-RS configuration received from the base station, e.g., as described in connection with 814 in FIG. 8.

The apparatus may include a parameter component 914 configured to receive, e.g., via reception component 904, a parameter indicating downlink data channel is rate matched based on symbol level rate matching, e.g., as described in connection with 802 in FIG. 8.

The apparatus may include an aperiodic tracking reference signal component 918 configured to receive, e.g., via reception component 904, at least one configuration of an aperiodic tracking reference signal resource, e.g., as described in connection with 808 in FIG. 8. The apparatus may include a resource mapping match component 920 configured to determine, e.g., based on the A-TRS configuration from component 918 and the ZP CSI-RS configuration from ZP CSI-RS component 908, whether a first resource mapping of the ZP CSI-RS configuration matches a second resource mapping of the at least one configuration of the aperiodic tracking reference signal resource, e.g., as described in connection with 810 in FIG. 8.

The apparatus may include a rate matching type component 916 configured to receive, e.g., via reception component 904, a second indication indicating whether the rate matching is symbol level rate matching or resource element level rate matching, e.g., as described in connection with 806.

The apparatus may include additional components that perform each of the blocks of the algorithm in the aforementioned flowcharts of FIGS. 7-8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 10:
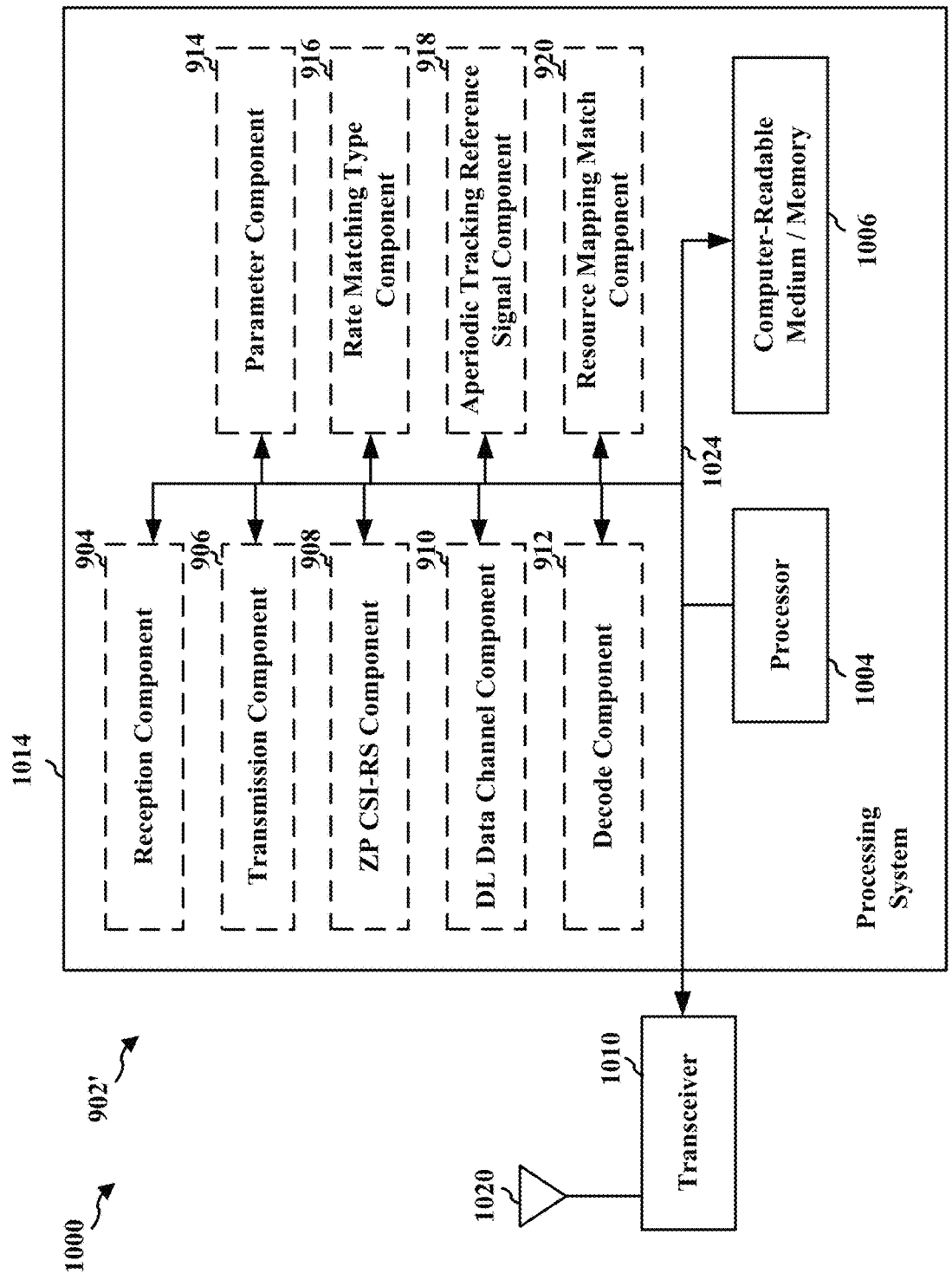
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 904, 906, 908, 910, 912, 914, 916, 918, 920, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 904. In addition, the transceiver 1010 receives information from the processing system 1014, specifically the transmission component 906, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 904, 906, 908, 910, 912, 914, 916, 918, 920. The components may be software components running in the processor 1004, resident/stored in the computer readable medium/memory 1006, one or more hardware components coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for receiving an indication of a ZP CSI-RS configuration from a base station, the indication comprised in a downlink control channel scheduling a downlink data channel; means for receiving the downlink data channel, wherein the downlink data channel is rate matched around CSI-RS resources indicated in the ZP CSI-RS configuration; means for decoding the downlink data channel based on the indication of the ZP CSI-RS configuration received from the base station; means for receiving a parameter indicating downlink data channel is rate matched based on symbol level rate matching; means for receiving at least one configuration of an aperiodic tracking reference signal resource; means for determining whether a first resource mapping of the ZP CSI-RS configuration matches a second resource mapping of the at least one configuration of the aperiodic tracking reference signal resource; and means for receiving a second indication indicating whether the rate matching is symbol level rate matching or resource element level rate matching. The aforementioned means may be one or more of the aforementioned components of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
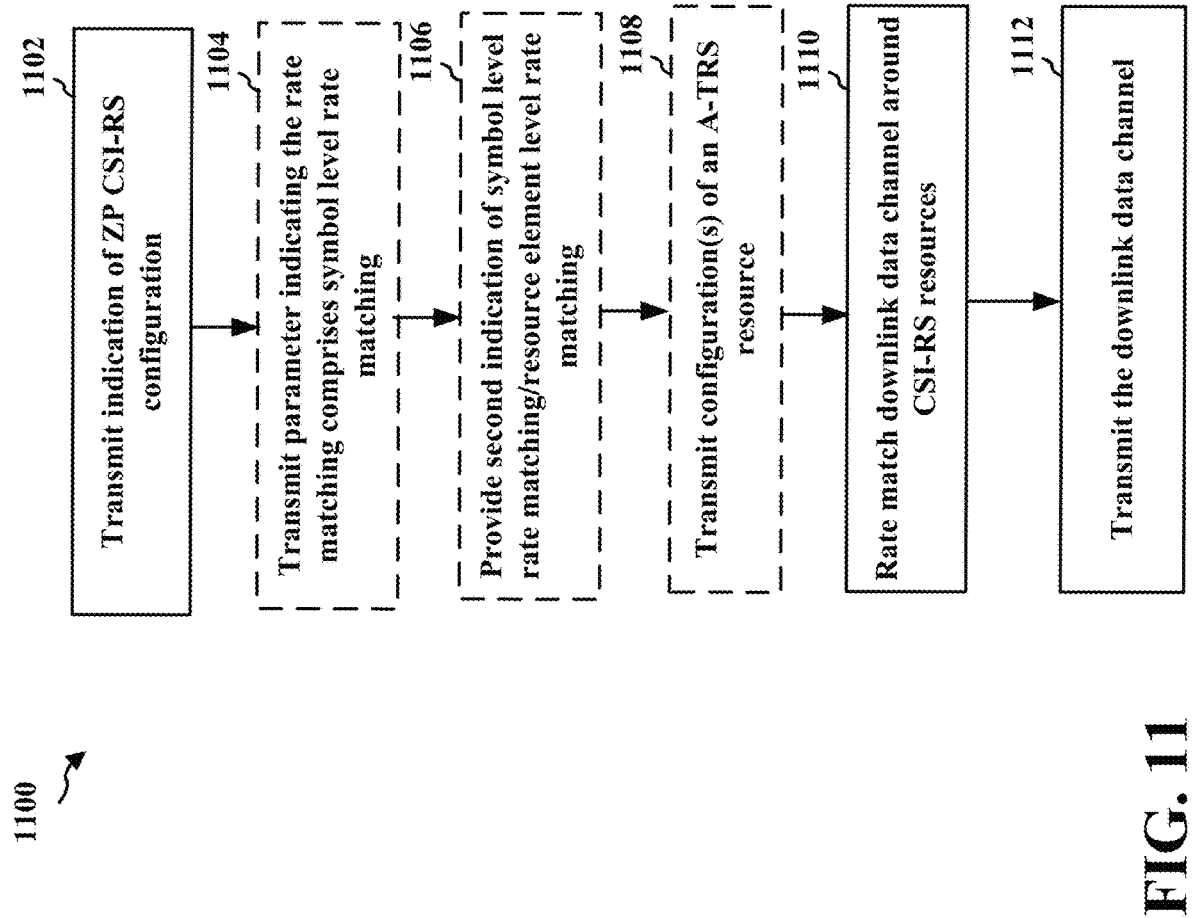
FIG. 11 is a flowchart of a method of wireless communication.

FIG. 11 is a flowchart 1100 of a method of wireless communication. The method may be performed by a base station (e.g., base station 102, 180, 402, 702, 950, the apparatus 1202, 1202') communicating with a UE (e.g., UE 104, 350, 404, 704, 1250, the apparatus 902, 902'). The wireless communication may comprise 5G NR communication, e.g., FR2 or mmW communication, as described herein. Optional aspects are illustrated with a dashed line. The method provides a solution to problems that may occur with decoding PDSCH at the UE when the UE is not aware of the presence of multiplexed aperiodic CSI-RS in PDSCH.

At 1102, the base station transmits an indication of a ZP CSI-RS configuration to a UE, the indication comprised in a downlink control channel scheduling a downlink data channel. For example, the indication may be comprised in a DL DCI (e.g., 604, 705) scheduling PDSCH for the UE, e.g., such as DL DCI 705 in FIG. 7. The ZP CSI-RS may be configured for rate matching of an aperiodic tracking reference signal, for example.

At 1110, the base station rate matches the downlink data channel around CSI-RS resources indicated in the ZP CSI-RS configuration, e.g., as described in connection with 707 in FIG. 7. For example, the base station may perform symbol level rate matching of the PDSCH around the CSI-RS resources as described in connection with FIG. 5B or resource element rate matching as described in connection with FIG. 5A.

The base station may transmit, at 1104, a parameter indicating to the UE that the rate matching comprises symbol level rate matching. The parameter may comprise an RRC parameter comprised in the ZP CSI-RS configuration In another example, the UE may determine whether symbol level rate matching or resource element level rate matching is applied based on other information. For example, the base station may transmit at least one configuration of an aperiodic tracking reference signal resource, at 1108. Symbol level rate matching of the data channel around the CSI-RS may be performed when a first resource mapping of the ZP CSI-RS configuration matches a second resource mapping of the at least one configuration of the aperiodic tracking reference signal resource. Otherwise, resource element level rate matching may be employed.

In another example, the base station may provide a second indication indicating whether the rate matching is symbol level rate matching or resource element level rate matching, at 1106. When the second indication is not configured by the base station, the type of the rate matching performed may be resource element level rate matching. The second indication may comprise at least one bit field configured in downlink control information, wherein a first value indicates resource element level rate matching and a second value indicates symbol level rate matching.

The CSI-RS resources may comprise a resource for an aperiodic tracking reference signal, and resource element level rate matching may be indicated when a QCL-TypeD parameter of the data channel is the same as a QCL-TypeD parameter of the resource for the aperiodic tracking reference signal. In another example, symbol level rate matching may be indicated when a QCL-TypeD parameter of the data channel are different than a QCL-TypeD parameter of the resource for the aperiodic tracking reference signal.

Resource element level rate matching may be indicated when the ZP CSI-RS is for rate matching for CSI-RS resources for a second, co-scheduled UE.

At 1112, the base station transmits the downlink data channel, e.g., as described in connection with 709 in FIG. 7. The base station may also transmit the CSI-RS around which the downlink data channel is rate matched.

Figure 12:
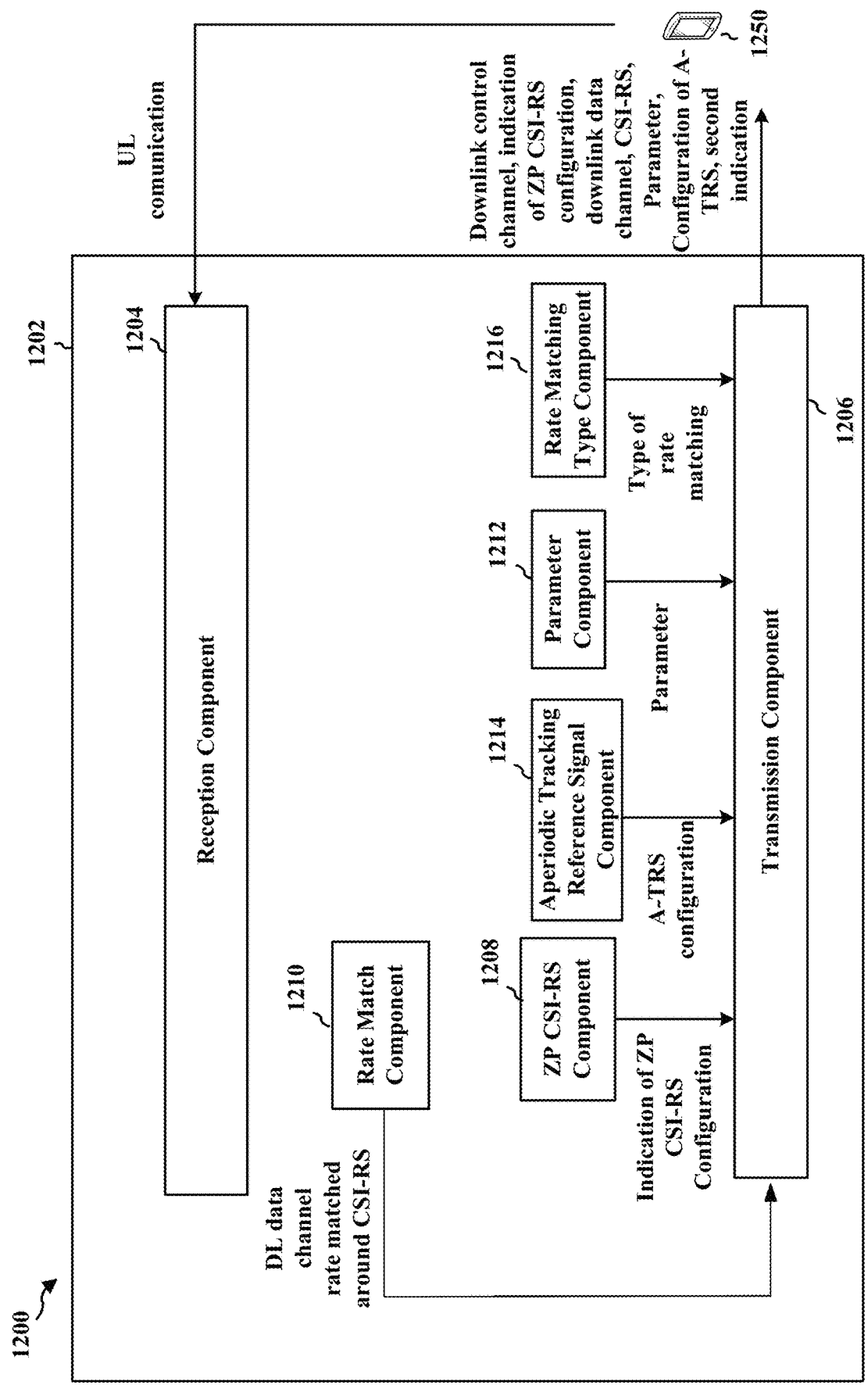
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a base station (e.g., base station 102, 180, 402, 702, 950 communicating with a UE (e.g., UE 104, 350, 404, 704, 1250, the apparatus 902, 902'). The wireless communication may comprise 5G NR communication, e.g., FR2 or mmW communication, as described herein. The apparatus includes a reception component 1204 configured to receive uplink communication from the UE 1250 and a transmission component 1206 configured to transmit downlink communication to the UE 1250. The apparatus includes a ZP CSI-RS component 1208 configured to transmit an indication of a ZP CSI-RS configuration to a user equipment, the indication comprised in a downlink control channel scheduling a downlink data channel, e.g., as described in connection with 1102. The apparatus includes a rate match component 1210 configured to rate match the downlink data channel around CSI-RS resources indicated in the ZP CSI-RS configuration, e.g., as described in connection with 1110. The apparatus includes the transmission component 1206 configured to transmit the downlink data channel, e.g., based on the rate matching applied by the rate match component, e.g., as described in connection with 1112. The apparatus may include a parameter component 1212 configured to transmit a parameter indicating that the rate matching comprises symbol level rate matching, e.g., as described in connection with 1104. The apparatus may include an aperiodic tracking reference signal component 1214 configured to transmit at least one configuration of an aperiodic tracking reference signal resource, e.g., as described in connection with 1108. The apparatus may include a rate matching type component 1216 configured to provide a second indication indicating whether the rate matching is symbol level rate matching or resource element level rate matching, e.g., as described in connection with 1106.

The apparatus may include additional components that perform each of the blocks of the algorithm in the aforementioned flowcharts of FIG. 7 and FIG. 11. As such, each block in the aforementioned flowcharts of FIG. 7 and FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
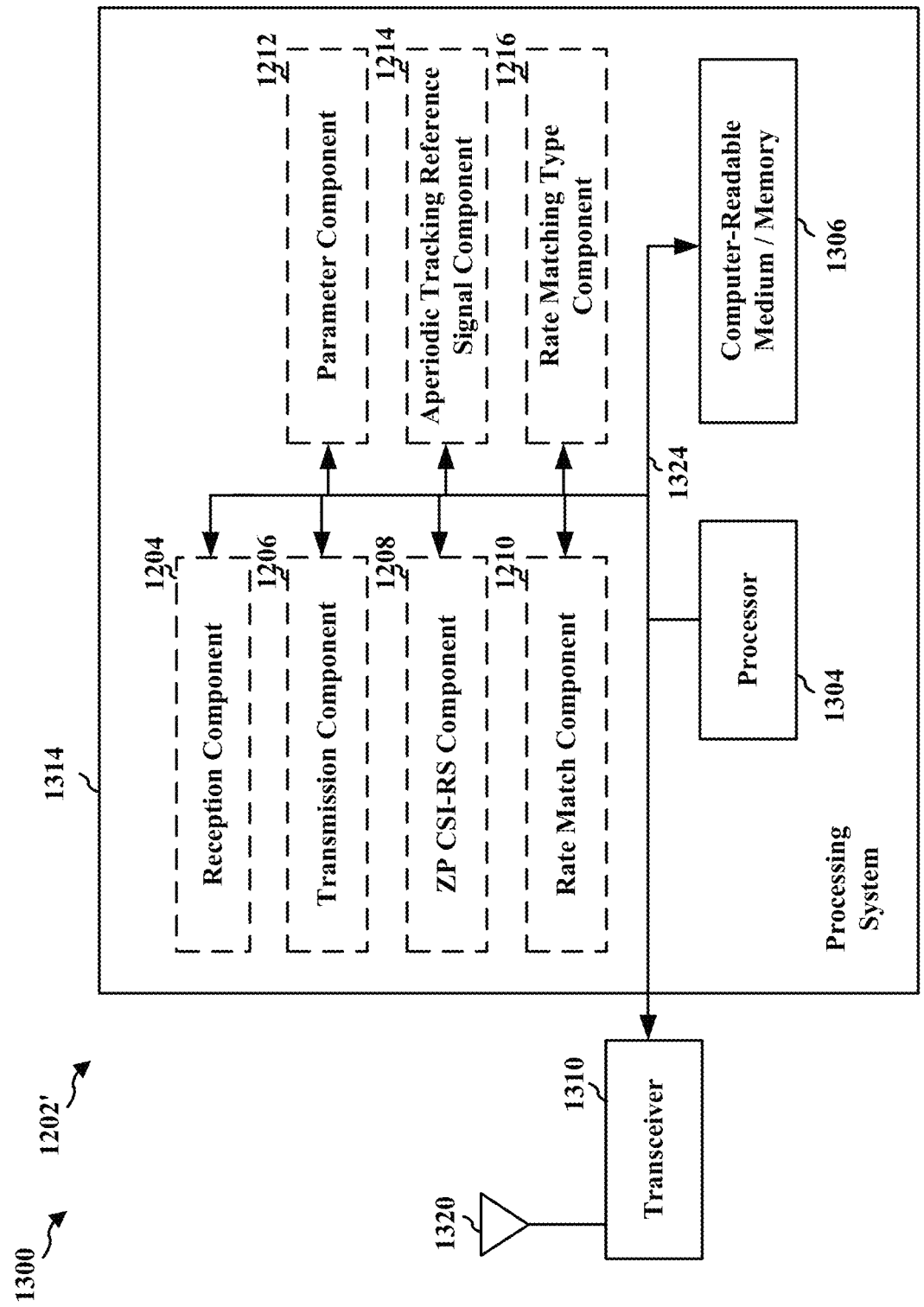
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for transmitting an indication of a ZP CSI-RS configuration to a user equipment, the indication comprised in a downlink control channel scheduling a downlink data channel; means for rate matching the downlink data channel around CSI-RS resources indicated in the ZP CSI-RS configuration; means for transmitting the downlink data channel; means for transmitting a parameter indicating that the rate matching comprises symbol level rate matching; means for transmitting at least one configuration of an aperiodic tracking reference signal resource; means for providing a second indication indicating whether the rate matching is symbol level rate matching or resource element level rate matching. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
   receiving a downlink control channel scheduling a downlink data channel, wherein the downlink control channel comprises an indication of a zero-power channel state information-reference signal (ZP CSI-RS) configuration from a base station, wherein the ZP CSI-RS configuration corresponds to resources associated with an aperiodic tracking reference signal;
   receiving the downlink data channel, wherein the downlink data channel is rate matched around CSI-RS resources indicated in the ZP CSI-RS configuration;
   decoding the downlink data channel based on the indication of the ZP CSI-RS configuration received from the base station;
   receiving a second indication indicating whether the rate matching is symbol level rate matching or resource element level rate matching; and
   selecting a type of the rate matching on which the decoding is based, based on the second indication.

2. The method of claim 1, wherein the UE decodes the downlink data channel based on symbol level rate matching by the base station of the downlink data channel around the CSI-RS resources.

3. The method of claim 1, further comprising:
   receiving a parameter indicating the downlink data channel is rate matched based on the symbol level rate matching.

4. The method of claim 3, wherein the parameter is comprised in the ZP CSI-RS configuration that is comprised in a Radio Resource Control (RRC) message.

5. The method of claim 1, further comprising:
   receiving a second ZP CSI-RS configuration; and
   determining whether a first resource mapping of the ZP CSI-RS configuration matches a second resource mapping of the second ZP CSI-RS configuration,
   wherein the UE decodes the downlink data channel based on a symbol level rate matching around the CSI-RS resources when the first resource mapping matches the second resource mapping.

6. The method of claim 1, wherein when the second indication is not configured, the type of the rate matching is the resource element level rate matching.

7. The method of claim 1, wherein the second indication comprises flag in a downlink control information, wherein a first value indicates the resource element level rate matching and a second value indicates the symbol level rate matching.

8. The method of claim 1, wherein the CSI-RS resources comprise a resource for an aperiodic tracking reference signal, and wherein the resource element level rate matching is indicated when a Quasi Co-Location TypeD (QCL-TypeD) parameter of the downlink data channel is the same as a QCL-TypeD parameter of the resource for the aperiodic tracking reference signal.

9. The method of claim 1, wherein the CSI-RS resources comprise a resource for an aperiodic tracking reference signal, wherein the symbol level rate matching is indicated when a Quasi Co-Location TypeD (QCL-TypeD) parameter of the downlink data channel is different than a QCL-TypeD parameter of the resource for the aperiodic tracking reference signal.

10. The method of claim 1, wherein the resource element level rate matching is indicated when the ZP CSI-RS is for rate matching for CSI-RS resources for a second, co-scheduled UE.

11. An apparatus for wireless communication at a user equipment (UE), comprising:
    a memory; and
    at least one processor coupled to the memory and configured to:
      receive a downlink control channel scheduling a downlink data channel, wherein the downlink control channel comprises an indication of a zero-power channel state information-reference signal (ZP CSI-RS) configuration from a base station, wherein the ZP CSI-RS configuration corresponds to resources associated with an aperiodic tracking reference signal;
      receive the downlink data channel, wherein the downlink data channel is rate matched around CSI-RS resources indicated in the ZP CSI-RS configuration;
      decode the downlink data channel based on the indication of the ZP CSI-RS configuration received from the base station;
      receive a second indication indicating whether the rate matching is symbol level rate matching or resource element level rate matching; and
      select a type of the rate matching on which the decoding is based, based on the second indication.

12. The apparatus of claim 11, wherein the at least one processor is further configured to:
    receive a parameter indicating downlink data channel is rate matched based on symbol level rate matching.

13. The apparatus of claim 11, wherein the at least one processor is further configured to:
    receive at least one configuration of an aperiodic tracking reference signal resource; and
    determine whether a first resource mapping of the ZP CSI-RS configuration matches a second resource mapping of the at least one configuration of the aperiodic tracking reference signal resource,
    wherein the UE decodes the downlink data channel based on a symbol level rate matching around the CSI-RS resources when the first resource mapping matches the second resource mapping.

14. A method of wireless communication at a base station, comprising:
    transmitting a downlink control channel scheduling a downlink data channel, wherein the downlink control channel comprises an indication of a zero-power channel state information-reference signal (ZP CSI-RS) configuration to a user equipment, wherein the ZP CSI-RS configuration is configured for rate matching of an aperiodic tracking reference signal;

rate matching the downlink data channel around CSI-RS resources indicated in the ZP CSI-RS configuration;

transmitting the downlink data channel; and providing a second indication having a binary value indicating whether the rate matching is symbol level rate matching or resource element level rate matching.

15. The method of claim 14, wherein the rate matching comprises symbol level rate matching.

16. The method of claim 14, wherein the second indication is comprised in the ZP CSI-RS configuration that is comprised in a Radio Resource Control (RRC) message.

17. A method of wireless communication at a base station, comprising:

transmitting a downlink control channel scheduling a downlink data channel, wherein the downlink control channel comprises an indication of a zero-power channel state information-reference signal (ZP CSI-RS) configuration to a user equipment, wherein the ZP CSI-RS is configured for rate matching of an aperiodic tracking reference signal;

rate matching the downlink data channel around CSI-RS resources indicated in the ZP CSI-RS configuration;

transmitting the downlink data channel; and transmitting at least one configuration of an aperiodic tracking reference signal resource, wherein symbol level rate matching of the downlink data channel around the CSI-RS is performed when a first resource mapping of the ZP CSI-RS configuration matches a second resource mapping of the at least one configuration of the aperiodic tracking reference signal resource.

18. The method of claim 14, further comprising:

providing a second indication indicating whether the rate matching is symbol level rate matching or resource element level rate matching.

19. The method of claim 18, wherein when the second indication is not configured, a type of the rate matching is the resource element level rate matching.

20. The method of claim 18, wherein the second indication comprises flag in downlink control information, wherein a first value indicates the resource element level rate matching and a second value indicates the symbol level rate matching.

21. A method of wireless communication at a base station, comprising:

transmitting a downlink control channel scheduling a downlink data channel, wherein the downlink control channel comprises an indication of a zero-power channel state information-reference signal (ZP CSI-RS) configuration to a user equipment, wherein the ZP CSI-RS is configured for rate matching of an aperiodic tracking reference signal;

rate matching the downlink data channel around CSI-RS resources indicated in the ZP CSI-RS configuration;

transmitting the downlink data channel; and providing a second indication indicating whether the rate matching is symbol level rate matching or resource element level rate matching;

wherein the CSI-RS resources comprise a resource for an aperiodic tracking reference signal, and wherein the resource element level rate matching is indicated when a Quasi Co-Location TypeD (QCL-TypeD) parameter of the downlink data channel is the same as a QCL-TypeD parameter of the resource for the aperiodic tracking reference signal.

22. A method of wireless communication at a base station, comprising:

transmitting a downlink control channel scheduling a downlink data channel, wherein the downlink control channel comprises an indication of a zero-power channel state information-reference signal (ZP CSI-RS) configuration to a user equipment, wherein the ZP CSI-RS is configured for rate matching of an aperiodic tracking reference signal;

rate matching the downlink data channel around CSI-RS resources indicated in the ZP CSI-RS configuration;

transmitting the downlink data channel; and providing a second indication indicating whether the rate matching is symbol level rate matching or resource element level rate matching;

wherein the CSI-RS resources comprise a resource for an aperiodic tracking reference signal, and wherein the symbol level rate matching is indicated when a Quasi Co-Location TypeD (QCL-TypeD) parameter of the downlink data channel is different than a QCL-TypeD parameter of the resource for the aperiodic tracking reference signal.

23. A method of wireless communication at a base station, comprising:

transmitting a downlink control channel scheduling a downlink data channel, wherein the downlink control channel comprises an indication of a zero-power channel state information-reference signal (ZP CSI-RS) configuration to a user equipment, wherein the ZP CSI-RS is configured for rate matching of an aperiodic tracking reference signal;

rate matching the downlink data channel around CSI-RS resources indicated in the ZP CSI-RS configuration;

transmitting the downlink data channel; and providing a second indication indicating whether the rate matching is symbol level rate matching or resource element level rate matching;

wherein the resource element level rate matching is indicated when the ZP CSI-RS is for rate matching for CSI-RS resources for a second, co-scheduled UE.

24. An apparatus for wireless communication at a base station, comprising:

a memory; and at least one processor coupled to the memory and configured to:

transmit a downlink control channel scheduling a downlink data channel, wherein the downlink control channel comprises an indication of a zero-power channel state information-reference signal (ZP CSI-RS) configuration to a user equipment, wherein the ZP CSI-RS configuration is configured for rate matching of an aperiodic tracking reference signal;

rate match the downlink data channel around CSI-RS resources indicated in the ZP CSI-RS configuration;

transmit the downlink data channel; and provide a binary second indication indicating whether the rate matching is symbol level rate matching or resource element level rate matching.

25. An apparatus for wireless communication at a base station, comprising:

a memory; and at least one processor coupled to the memory and configured to:

transmit a downlink control channel scheduling a downlink data channel, wherein the downlink control channel comprises an indication of a zero-power channel state information-reference signal (ZP CSI- RS) configuration to a user equipment, wherein the ZP CSI-RS is configured for rate matching of an aperiodic tracking reference signal;

rate match the downlink data channel around CSI-RS resources indicated in the ZP CSI-RS configuration;

transmit the downlink data channel; and transmit at least one configuration of an aperiodic tracking reference signal resource, wherein symbol level rate matching of the downlink data channel around the CSI-RS is performed when a first resource mapping of the ZP CSI-RS configuration matches a second resource mapping of the at least one configuration of the aperiodic tracking reference signal resource.

* * * * *